(12) United States Patent
Hsu

(10) Patent No.: US 6,477,785 B1
(45) Date of Patent: Nov. 12, 2002

(54) MEASURING TAPE HAVING A QUICK AND EFFORT-SAVING RETRACTING DEVICE

(76) Inventor: Cheng-Hui Hsu, No. 126, Pad Chung Road, Hsin Tien City, Taipei Hsien (TW)

( * ) Notice: Subject to any disclaimer, the term of this patent is extended or adjusted under 35 U.S.C. 154(b) by 0 days.

(21) Appl. No.: 09/910,766

(22) Filed: Jul. 24, 2001

(51) Int. Cl.[7] .................................................. G01B 3/10
(52) U.S. Cl. ........................................ 33/761; 242/395
(58) Field of Search ........................ 33/755, 756, 761, 33/769; 242/334, 393, 395, 395.1, 916

(56) References Cited

U.S. PATENT DOCUMENTS

| | | | | |
|---|---|---|---|---|
| 4,272,036 A | * | 6/1981 | Watermann | 242/395.1 |
| 4,813,625 A | * | 3/1989 | Takeda | 33/761 |
| 5,615,844 A | * | 4/1997 | Bosch | 242/395 |
| 5,718,056 A | * | 2/1998 | Miyasaka et al. | 33/761 |
| 6,134,801 A | * | 10/2000 | Miyasaka | 33/755 |
| 6,357,133 B1 | * | 3/2002 | Hsu | 33/761 |

* cited by examiner

Primary Examiner—Christopher W. Fulton
(74) Attorney, Agent, or Firm—Rosenberg, Klein & Lee

(57) ABSTRACT

The present invention discloses a measuring tape having a quick and effort-saving retracting device, comprising a front casing, a rear casing, a measuring tape axle base, a reverse axle, a reverse gear, a fastener, a gear casing, and a driving axle rod; more particularly a measuring tape that provides a retraction for a long-distance measurement and a device having a quick and effort-saving effect for enhancing the practicability of a measuring tape.

1 Claim, 4 Drawing Sheets

MEASURING TAPE HAVING A QUICK AND EFFORT-SAVING RETRACTING DEVICE

BACKGROUND OF THE INVENTION

1. Field of the Invention

The present invention relates to a measuring tape having a quick and effort-saving retracting device, more particularly a measuring tape that provides a retraction for a long-distance measurement and a device having a quick and effort-saving effect for enhancing the practicability of a measuring tape.

2. Description of the Prior Art

With regard to the traditional measuring tape, we directly use the measuring tape axle rod for retracting the measuring tape for a long-distance measurement, which has a large frictional resistance. Further, after pulling out a long section of the measuring tape for a long-distance measurement, it takes a long time and much effort to retract the tape. To make such traditional measuring tape more practical and convenient, the inventor of the present invention based on years of experience in the related industry conducted extensive research to enhance the traditional measuring tape herein which is hereby submitted for patent application.

Therefore, the primary objective of the present invention is to provide a measuring tape having a quick and effort-saving retracting device to reduce the frictional resistance of the retraction and to enhance the practicability of the measuring tape.

To make it easier for our examiner to understand the objective of the invention, its performance and advantages, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
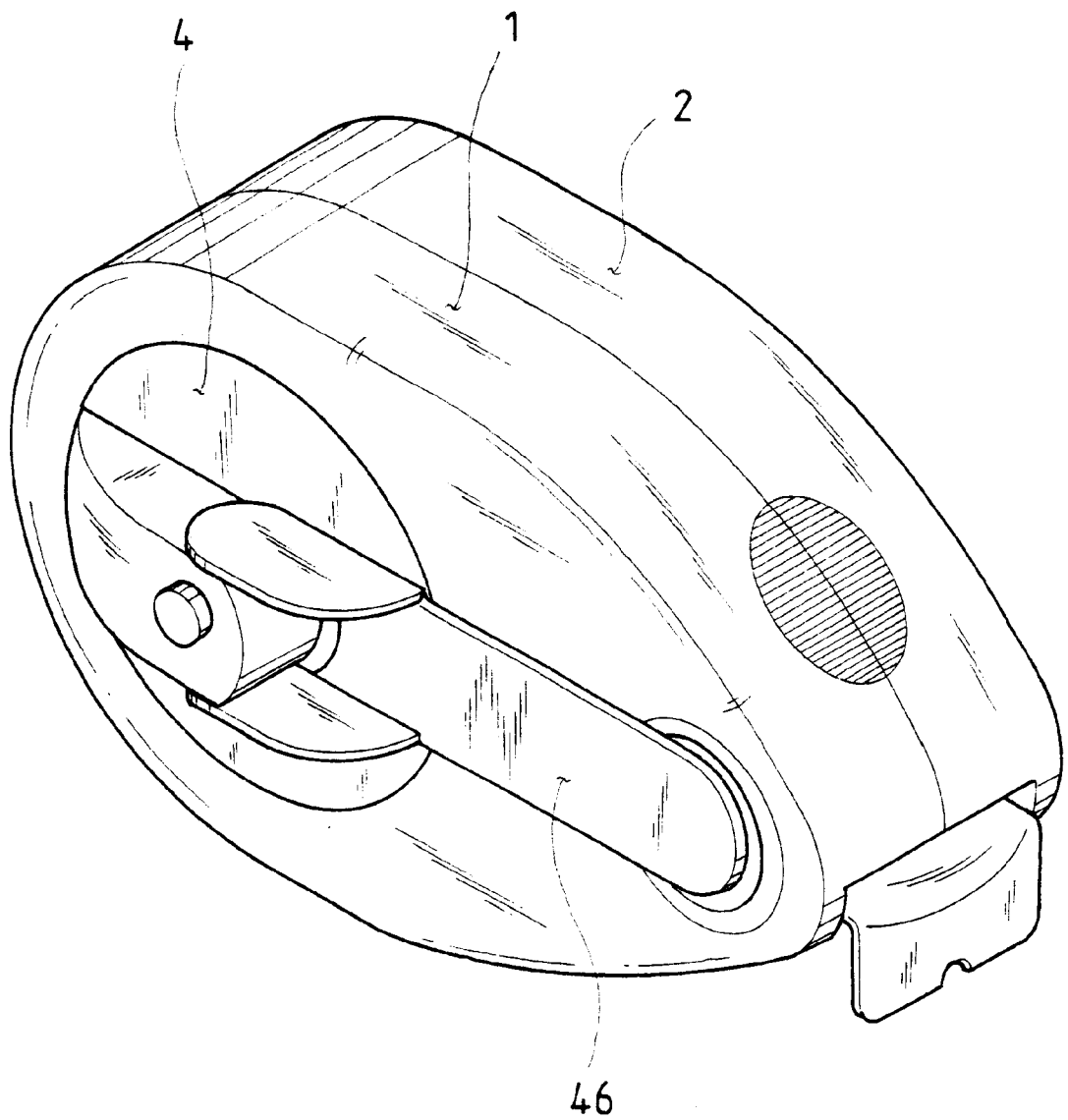
FIG. 1 shows the three-dimensional assembled structure of a preferred embodiment of the present invention.
Figure 2:
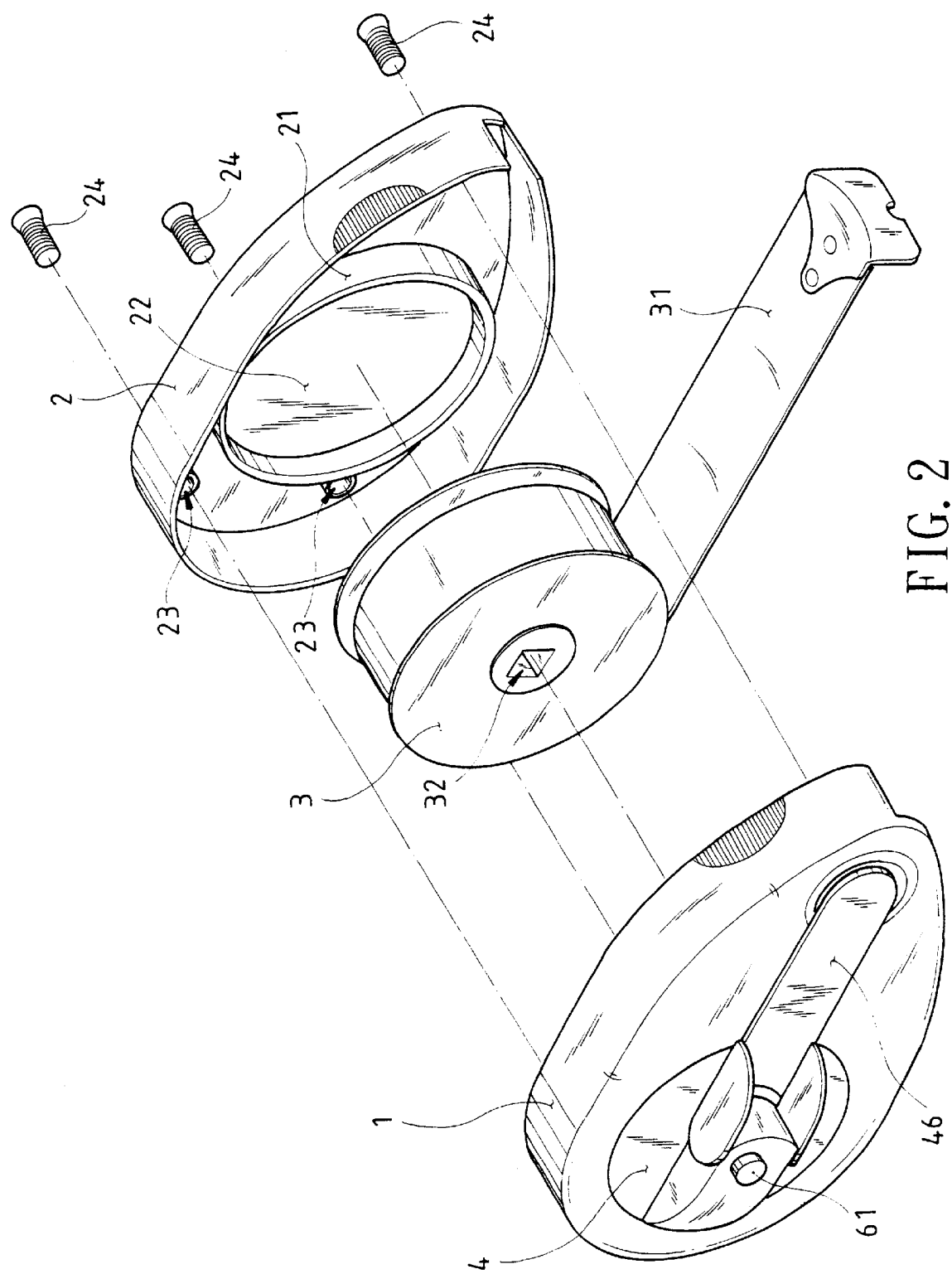
FIG. 2 shows the three-dimensional disassembled parts of the structure according to a preferred embodiment of the present invention.
Figure 3:
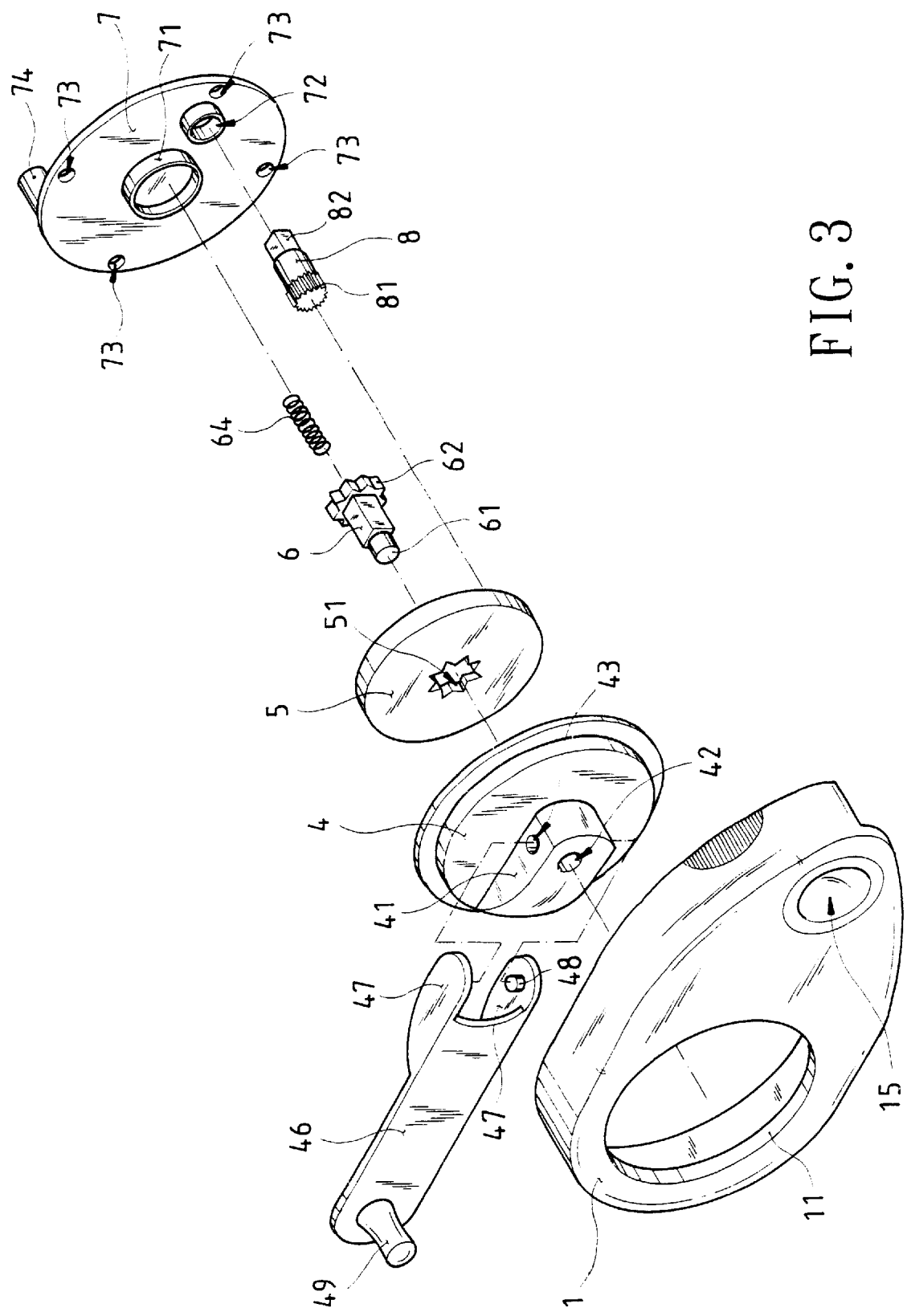
FIG. 3 shows the three-dimensional disassembled parts of the retracting gear set according to the present invention.
Figure 4:
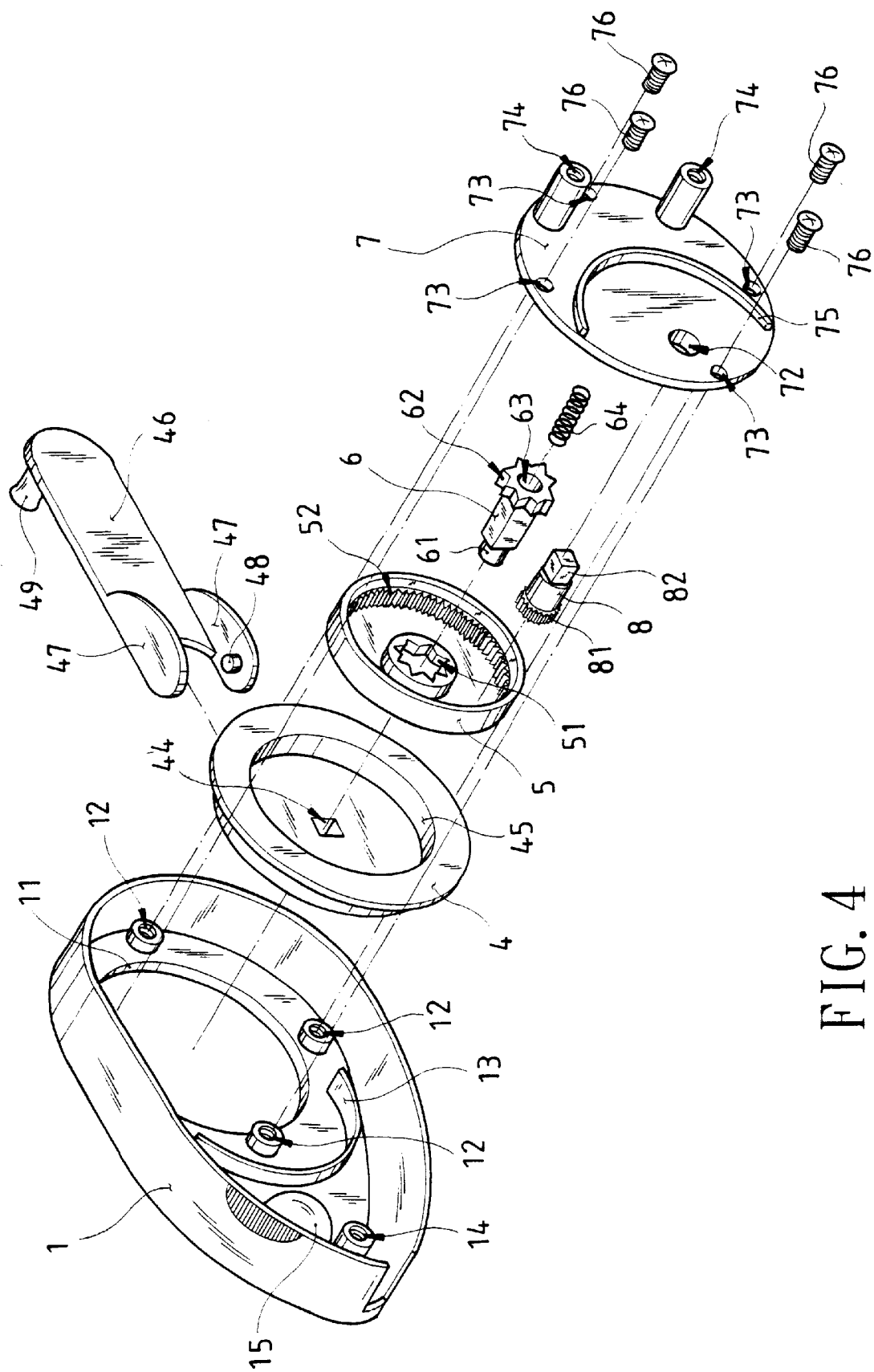
FIG. 4 is another diagram showing the three-dimensional disassembled parts of the retracting gear set according to the present invention.

Please refer to FIGS. 1, 2, 3, and 4. The present invention discloses a measuring tape having a quick and effort-saving retracting device comprising a front casing (1), a rear casing (2), a measuring tape axle base (3), a reverse axle (4), a reverse gear (5), a fastener (6), a gear casing (7), and a driving axle rod (8); wherein the front casing (1) is formed by integral injection of plastic material, having a circular opening at its rear section, a supporting flange (11) protruded inward, and a plurality of screw pillars (12) being disposed around the circumference of the supporting flange (11). A positioning arc bracket (13) is protruded and disposed in the middle of the inner side of the front casing (1), and a combined screw pillar (14) is protruded at the front end in the middle of the inner side of the front casing (1). Furthermore, a concave hemispherical supporting member (15) is disposed at the front edge of the front casing (1).

The rear casing (2) is formed by the integral injection of plastic material, having a positioning ring (21) protruded in the middle of the inner side of the rear casing (2), and the positioning ring (21) has a supporting surface (22) inside, and a plurality of circular holes (23) on the lateral side of the rear casing (2).

The measuring tape axle base (3) is for coiling the tape (31) and has a rectangular groove hole (32) in the middle of the measuring tape axle base (3).

The reverse axle (4) has a protruded arc driving member (41) being protruded and disposed on the outer side of the reverse axle (4), and the protruded driving member (41) has a circular hole groove (42) penetrating the middle of the protruded driving member (41), and has an axial hole (43) each on the upper and lower sides. The reverse axle (4) has a rectangular groove (44) in the middle of its inner side corresponding to the foregoing circular groove (42), and a supporting flange (45) being disposed inwardly on the inner side of the reverse axle (4). Further, a handle (46) has a latching plate (47) each on the upper and lower sides of the handle (46), and the latching plate (47) has a protruded axle (48) in its middle, and the other end of the handle (46) has a handle rod (49).

The reverse gear (5) has a star-shaped serrated groove (51) in the hollow space at its center, and the reverse gear (5) has an inner serrated ring (52) on its inner edge. The width of the inner serrated ring (52) is half of the thickness of the reverse gear (5).

The middle section of the fastener (6) is in the shape of a rectangular bar having a cylindrical press button protruded from one of its ends, and a star-shaped saw tooth (62) is disposed at the other end. The fastener (6) has a circular groove (63) in the middle of the end proximate to the star-shaped saw tooth (62) for receiving a spring (64).

The gear casing (7) is in the shape of a circular plate, and a positioning ring (71) is disposed in the middle of a side of the gear casing (7), and having a penetrating cylinder (72). A plurality of circular holes (73) are disposed around the circumference of the gear casing (7), and two sets of combined screw pillars (74) being protruded on a side of the gear casing (7), and the gear casing (7) uses the cylinder (72) as the center to set the positioning arc plate (75).

The middle section of the driving axle rod (8) is in the shape of a rod having a gear protruded from one of its ends, and a rectangular protruded pillar (82) protruded from the other end.

The present invention makes use of the reverse axle (4) to pass and accommodate into the supporting flange (11) of the front casing (1), and the handle (46) uses the protruded axle (48) at the center of the fastener (47) between two lateral sides of the handle (46) to sleeve the reverse gear (5) into the supporting flange (45) on the inner side of the reverse axle (4). The fastener (6) passes through the reverse gear (5) and penetrates the rectangular groove (44) of the reverse axle (4), and the button (61) on one end of the fastener protrudes out of the circular groove (42) of the reverse axle. The star-shaped saw tooth on the other end of the fastener is embedded into the star-shaped serrated groove hole (51) of the reverse gear (5). The driving rod (8) is sleeved on the cylinder (72) of the gear casing (7) and the rectangular protruded pillar (82) protrudes out of the gear casing (7). The gear (81) on the other end of the driving rod (8) and the inner serrated ring (52) of the reverse gear (5) are engaged to each other, and a plurality of screws (76) pass through a plurality of holes (73) on the gear casing (7) and being fixed to the screw pillar (12) of the front casing (1) by screws. The measuring tape axle base uses the rectangular hole (32) in the middle to sleeve and latch into the rectangular protruded pillar (82) of the driving axle rod (8) in order to corresponsively cover the front casing (1) with the rear casing (2). The measuring tape axle base (3) is framed to the positioning arc bracket (13) of the front casing (1), the positioning arc bracket (75) of the gear casing (7), and the positioning ring (21) of the rear casing (2). A plurality of combined screws (24) pass through the circular hole (23) of the rear casing (2) and are screwed to the combined screw pillar (74) of the gear casing (7) and the combined screw pillar (14) of the front casing (1) to form an integral structure.

The present invention combines the foregoing elements to form an integral measuring tape. When pulling out the tape for measurement, the user presses the button (61) of the fastener (6) inward, and the star-shaped saw tooth (62) on the other side of the fastener (6) is separated from the star-shaped serrated groove (51) of the reverse gear (5). The reverse axle (4) and the handle (46) will not rotate accordingly. When the measuring tape is retracted, the user releases the button (61) of the fastener (6) such that the spring (64) on the other end of the fastener (6) props up, and the star-shape saw tooth (62) of the fastener is embedded into the star-shaped serrated groove (51) of the reverse gear (5). The user bent the hand to a position that allows rotation, and the reverse handle (46) drives the reverse gear (5) to simultaneously drive the driving axle rod (8) to rotate, and it attains the quick and effort-saving effect of a measuring tape.

In summation of the above description, the present invention herein enhances the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A measuring tape having a quick and effort-saving retracting device, comprising a front casing, a rear casing, a measuring tape axle base, a reverse axle, a reverse gear, a fastener, a gear casing, and a driving axle rod; wherein:

the front casing, having a circular opening at its rear section, and a supporting flange being protruded inward, and a plurality of screw pillars being disposed around the circumference of the supporting flange, and a positioning arc bracket being protruded and disposed in the middle of the inner side of the front casing, and a combined screw pillar being protruded at the front end in the middle of the inner side of the front casing, and a concave hemispherical supporting member being disposed at the front edge of the front casing;

the rear casing, having a positioning ring protruded in the middle of the inner side of the rear casing, and the positioning ring having a supporting surface inside, and a plurality of circular holes on the lateral side of the rear casing;

the measuring tape axle base, for coiling the tape (31) and having a rectangular groove hole in the middle of the measuring tape axle base;

the reverse axle having a protruded arc driving member protruded and disposed on the outer side of the reverse axle, and the protruded driving member having a circular hole groove that penetrates in the middle of the protruded driving member, and having an axial hole each on the upper and lower sides, and the reverse axle having a rectangular groove in the middle of its inner side corresponding to said circular hole groove, and a supporting flange being disposed inwardly on the inner side of the reverse axle, and a handle having a latching plate each on the upper and lower sides of the handle, and the latching plate having a protruded axle in its middle, and the other end of the handle having a handle rod;

the reverse gear having a star-shaped serrated groove in the hollow space at its center, and the reverse gear having an inner serrated ring on its inner edge, and the width of the inner serrated ring is half of the thickness of the reverse gear;

the middle section of the fastener which is in the shape of a rectangular bar having a cylindrical press button protruded from one of its ends, and a star-shaped saw tooth being disposed at the other end, and the fastener having a circular hole groove in the middle of the end proximate to the star-shaped saw tooth for receiving a spring;

the gear casing, which is in the shape of a circular plate, and a positioning ring being disposed in the middle of a side of the gear casing, and having a penetrating cylinder, and a plurality of circular holes being disposed around the circumference of the gear casing, and two sets of combined screw pillars being protruded on a side of the gear casing, and the gear casing using the cylinder as the center to set the positioning arc plate in position;

the middle section of the driving axle rod is in the shape of a rod having a gear protruded from one of its ends, and a rectangular protruded pillar protruded from the other end;

by using the reverse axle to pass and accommodate into the supporting flange of the front casing, and the handle using the protruded axle at the center of the fastener between two lateral sides of the handle to sleeve the reverse gear into the supporting flange on the inner side of the reverse axle, the fastener passing through the reverse gear and penetrating the rectangular groove of the reverse axle, and the button on one end of the fastener protruding out of the circular groove of the reverse axle, and the star-shaped saw tooth on the other end of the fastener being embedded into the star-shaped serrated groove hole of the reverse gear, and the driving rod being sleeved on the cylinder of the gear casing and the rectangular protruded pillar protruding out of the gear casing, and the gear on the other end of the driving rod and the inner serrated ring of the reverse gear being engaged to each other, and a plurality of screws passing through a plurality of holes on the gear casing and being fixed to the screw pillar of the front casing by screws, and the measuring tape axle base using the rectangular hole in the middle to sleeve and latch into the rectangular protruded pillar of the driving axle rod in order to correspondingly cover the front casing with the rear casing, and the measuring tape axle base being framed to the positioning arc bracket of the front casing, the positioning arc bracket of the gear casing, and the positioning ring of the rear casing, and a plurality of combined screws passing through the circular hole of the rear casing and being screwed to the combined screw pillar of the gear casing and the combined screw pillar of the front casing to form an integral structure.

* * * * *